United States Patent
Bui et al.

(10) Patent No.: US 6,900,657 B2
(45) Date of Patent: May 31, 2005

(54) STALL DETECTION CIRCUIT AND METHOD

(75) Inventors: Tanh M. Bui, Cary, NC (US); Dacon T. Chow, Cary, NC (US)

(73) Assignee: Saia-Burgess Automotive, Inc., Cary, NC (US)

( * ) Notice: Subject to any disclaimer, the term of this patent is extended or adjusted under 35 U.S.C. 154(b) by 65 days.

(21) Appl. No.: 10/668,213

(22) Filed: Sep. 24, 2003

(65) Prior Publication Data

US 2005/0062494 A1 Mar. 24, 2005

(51) Int. Cl.$^7$ ................................................. G01R 31/06
(52) U.S. Cl. ...................................... 324/772; 324/545
(58) Field of Search .............................. 324/772, 158.1, 324/545, 119, 197; 73/54.35; 318/434, 280, 461, 432; 702/32–34, 183, 187

(56) References Cited

U.S. PATENT DOCUMENTS

| | | |
|---|---|---|
| 4,234,838 A | 11/1980 | Langley et al. |
| 4,581,565 A | 4/1986 | Van Pelt et al. |
| 4,978,898 A | 12/1990 | Tsukahara et al. |
| 5,153,487 A | 10/1992 | Hennig |
| 5,303,156 A | 4/1994 | Matsuoka et al. |
| 5,675,497 A * | 10/1997 | Petsche et al. ............... 702/182 |
| 5,767,654 A | 6/1998 | Menegoli et al. |
| 6,056,384 A | 5/2000 | Sato et al. |
| 6,078,154 A | 6/2000 | Manlove et al. |
| 6,236,227 B1 * | 5/2001 | Kliman et al. ............... 324/772 |
| 6,288,507 B1 | 9/2001 | Makino et al. |
| 6,437,533 B1 | 8/2002 | Du et al. |
| 6,498,446 B1 | 12/2002 | Menegoli et al. |

* cited by examiner

*Primary Examiner*—David Zarneke
*Assistant Examiner*—Jimmy Nguyen
(74) *Attorney, Agent, or Firm*—Jacobson Holman PLLC

(57) ABSTRACT

A stall detection circuit and method for a stepper motor. The circuit has an H-bridge configuration with an additional circuit pathway to ground being connected at a point between two center windings. During the transition between step sequences, the circuit employs a monitoring phase in which the previously active low side driver is turned off such that current passes through only the first winding and then is diverted to ground via the additional pathway. While the phase voltage is thus momentarily extinguished, the second coil is used to monitor the motor's back EMF, from which it can be determined whether the rotor is in a normal running mode, a stall, or a reverse condition.

15 Claims, 5 Drawing Sheets

Prior art

Forward

Reverse

STALL DETECTION CIRCUIT AND METHOD

BACKGROUND OF THE INVENTION

1. Field of the Invention

The present invention is directed to the monitoring of motor operation and, more particularly, to a stall detection circuit for two-phase, four-coil stepper motors operating in two-phase-on mode.

2. Description of the Related Art

Two-phase, four-coil stepper motors include a permanent magnet rotor 10 with multiple pole pairs, namely having two stator phases made up of two coils connected in series in each phase, as shown in FIG. 1.

Under typical operation, one H-bridge driver powers each phase. As shown in FIGS. 2A–2C, the standard H-bridge circuit includes a first path having a first switch S1 connected in series with a second switch S2 and, in parallel therewith, a second path having a third switch S3 in connected in series with a fourth switch S4. A pair of coils, coil 1 and coil 2, are connected in series on a branch between a node on the first path between the first and second switches, and a node on the second path between the third and fourth switches. A respective diode D may be connected to nodes on either side of each switch. While the first and second switches are connected in series, in operation of the circuit, the first and fourth switches act in series, and the second and third switches act in series, as explained herein.

Particularly, the standard H-bridge step sequences for forward, reverse and braking modes are depicted in FIGS. 2A–2C, respectively. The circuitry with the third and fourth coils of the second phase is arranged in the same way as that shown for coil 1 and coil 2, only 180 electrical degrees out of phase.

In the forward sequence shown in FIG. 2A, for example, current alternatingly flows through the first switch S1, coil 1 and coil 2, and the fourth switch S4, and then through the third switch S3, coil 2 and coil 1, and the second switch S2. In this configuration, back electromotive force (EMF) generated by the motor is masked by the supply voltage. Transient voltage across the switching coil shows little or no change, regardless of the rotor movement. It is therefore difficult to discern if the rotor has been blocked or rotated in the wrong direction.

Therefore, a need exists for a stall detection circuit providing a method for substantively differentiating normal running mode from a stall condition.

SUMMARY OF THE INVENTION

In view of the foregoing, one object of the present invention is to avoid the difficulties associated with the failure to recognize a motor stall condition.

Another object of the present invention is to provide a circuit that is able to detect changes in back EMF as generated by different rotor conditions to determine if the rotor is in normal running mode or has been blocked or rotated incorrectly.

A further object of the present invention is to provide an improved H-bridge circuit construction that includes an additional current flow path to clarify back EMF detection.

It is yet another object of the present invention to provide a circuit that is not complex in structure and may be implemented within existing circuits at low cost but yet used to efficiently monitor rotor conditions.

In accordance with this and other objects, the present invention is directed to a stall detection circuit having an H-bridge configuration with first and second windings, in which an additional circuit pathway is provided at a point between the two windings and extending to ground. During the transition between step sequences, the circuit employs a monitoring phase in which the low side driver is turned off such that current passes through only the first winding and then is diverted to ground via the additional pathway. The second coil is then used to monitor the motor's back EMF which, in turn, indicates whether the rotor is in normal running mode, stall or reverse condition.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
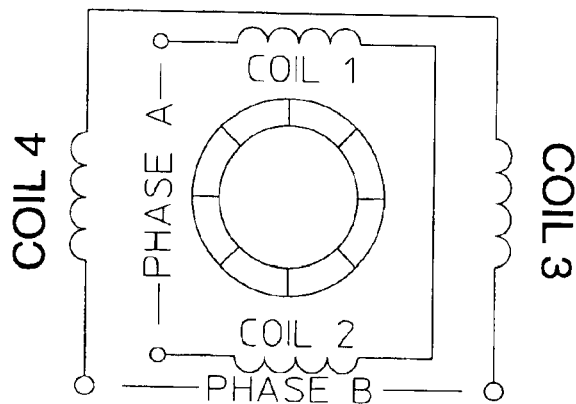
FIG. 1 shows a conventional motor with two stator phases made up of two coils connected in series in each phase.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 3:
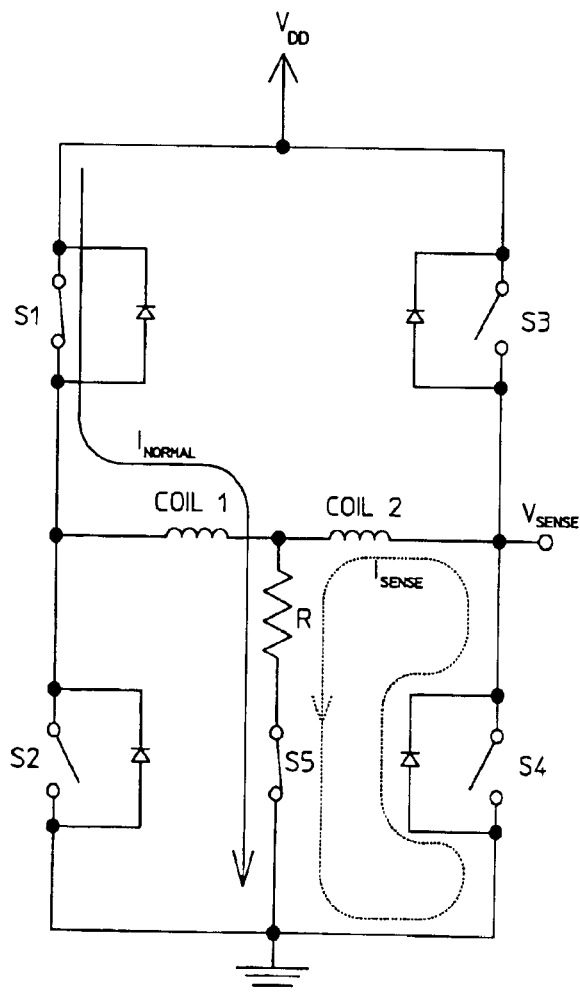
FIG. 3 illustrates a stall detection circuit for a stepper motor in accordance with the present invention.
Figure 2A:
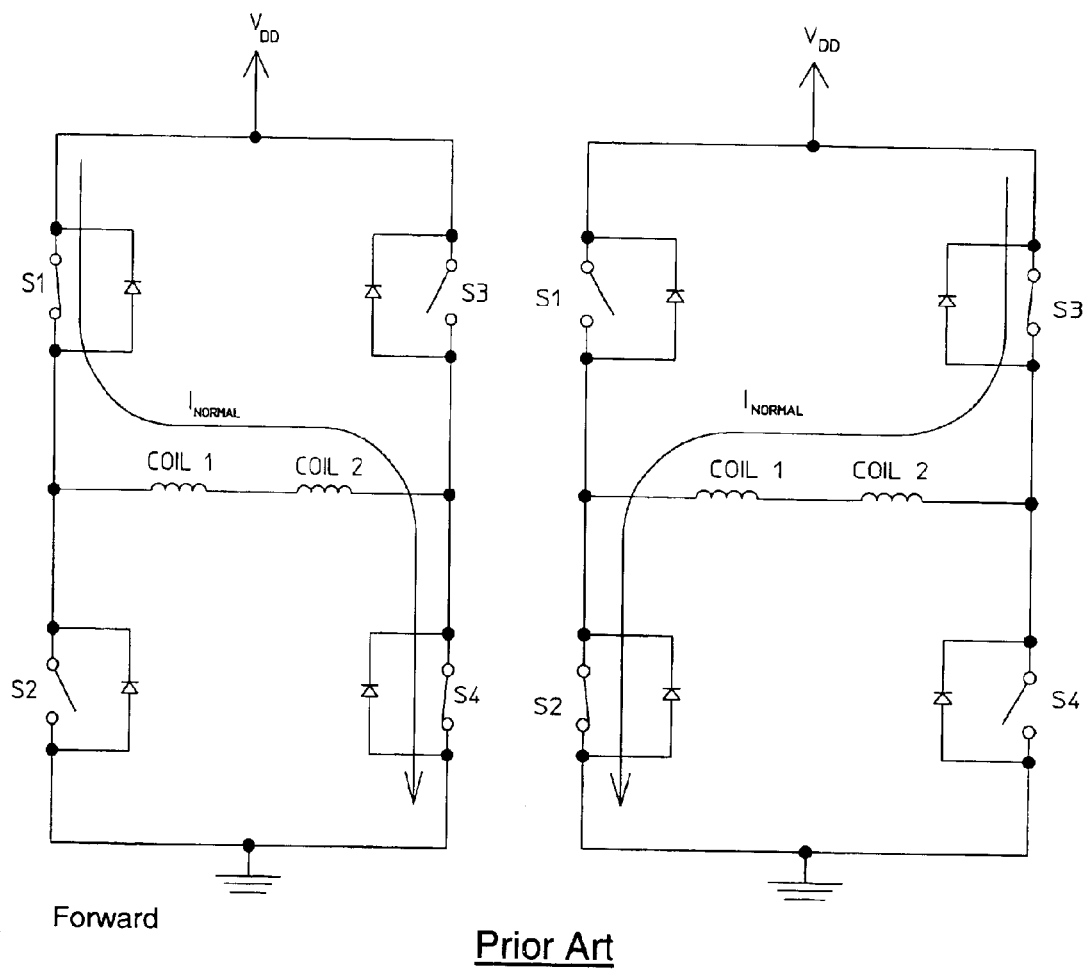
FIG. 2A is a circuit diagram of a conventional H-bridge step sequence for a stepper motor in the forward direction.
Figure 2B:
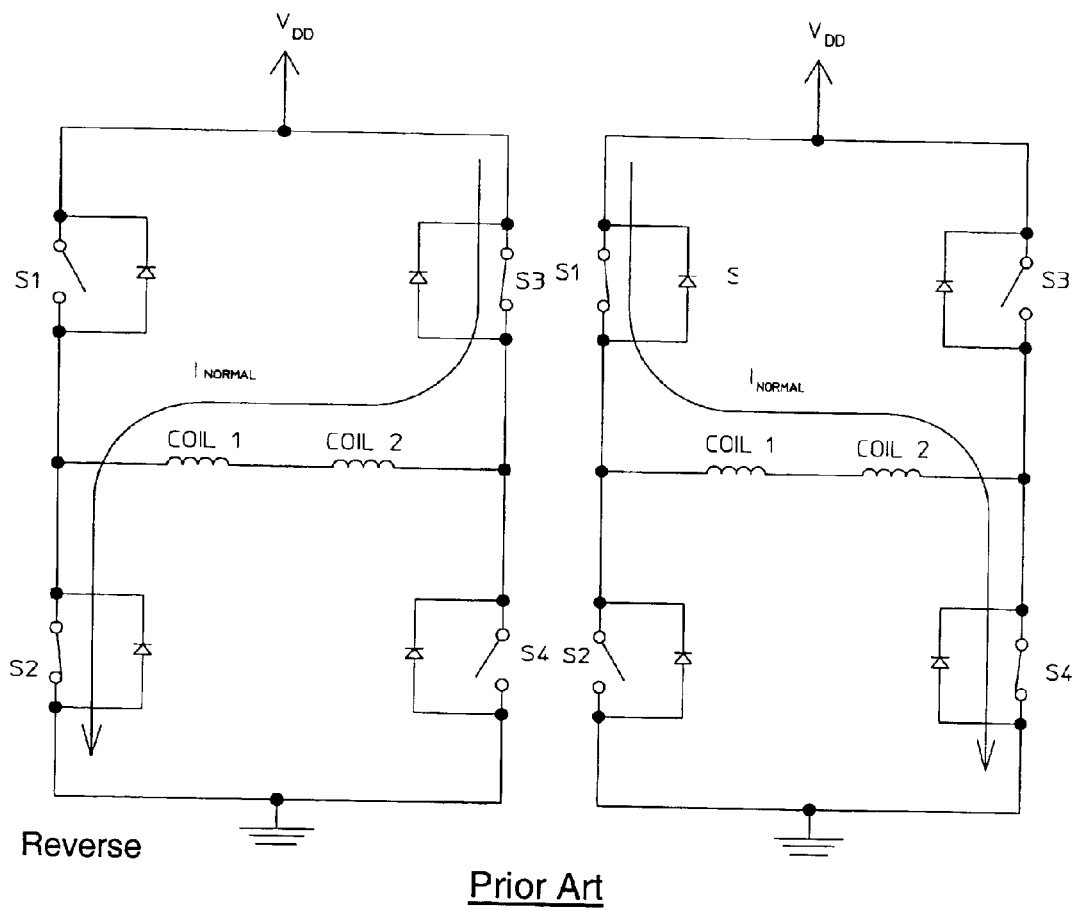
FIG. 2B is a circuit diagram of a conventional H-bridge step sequence for a stepper motor in the reverse direction.

The present invention is directed to a stall detection circuit such as that shown representatively in FIG. 3. As with the conventional circuit shown in FIGS. 2A–2C, one H-bridge driver powers each of the two steps of the four-coil stepper motor operating in two-phase-on mode. During a first step, switches S1 and S4 are closed, and during a second step, switches S3 and S2 are closed. The sequence of the steps changes according to whether the motor is in forward or reverse operating condition, as shown in FIGS. 2A and 2B, respectively.

According to the present invention, the stall detection circuit includes an additional fifth switch S5, which may be embodied as a transistor, connected at a branch node between coil 1 and coil 2 and ground, as shown in FIG. 3. A resistor R is also provided between the switch S5 and the node between the windings.

In order to monitor the back EMF during the transition between steps, the fifth switch S5 is turned on or closed at the end of each step sequence and, a few microseconds thereafter, the low-side driver S4 is turned off or opened. When switch S1 and switch S5 are on and the low-side driver S4 is off, current flows through the fifth switch S5 to ground and the sense voltage across switch S4 is used to monitor the back EMF. Of course, the circuit may be constructed with any one of the four coils acting as the back EMF monitoring coil.

A significant increase in transient current level during this monitoring phase is prevented by matching the resistance value of R to the resistance of the monitoring coil, coil 2. In this way, the dramatic drop in current to coil 2 that would otherwise result upon the closing of the fifth switch S5 and the opening of the fourth switch S4 is avoided through the mediating action of the series resistance R.

During the monitoring period between the step sequences, as is depicted in FIG. 3, upon the opening of the fourth switch S4, residual current at coil 2 flows through the diode D1 until such current is extinguished. Thereafter, the back EMF produced by the motor generates the current flow indicated by the dotted line 12 from which the sense voltage is detected.

Figure 4:
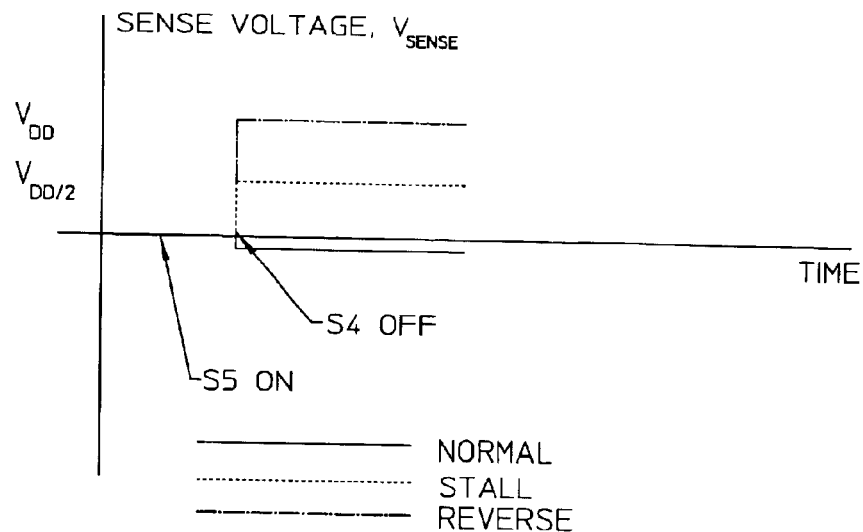
FIG. 4 graphically depicts the behavior of the motor's back EMF under normal running, stall and reverse conditions.

As illustrated in FIG. 4, the behavior of the motor's back EMF is distinctly different during normal running mode as compared with a stall condition. Therefore, by monitoring the differences in the sense voltage, $V_{sense}$, coming off of coil 2, it is possible to determine from the back EMF, which is now free of any masking by the supply voltage, whether the motor is operating normally or if, instead, the rotor has been blocked or rotated incorrectly.

Figures 5A, 5B:
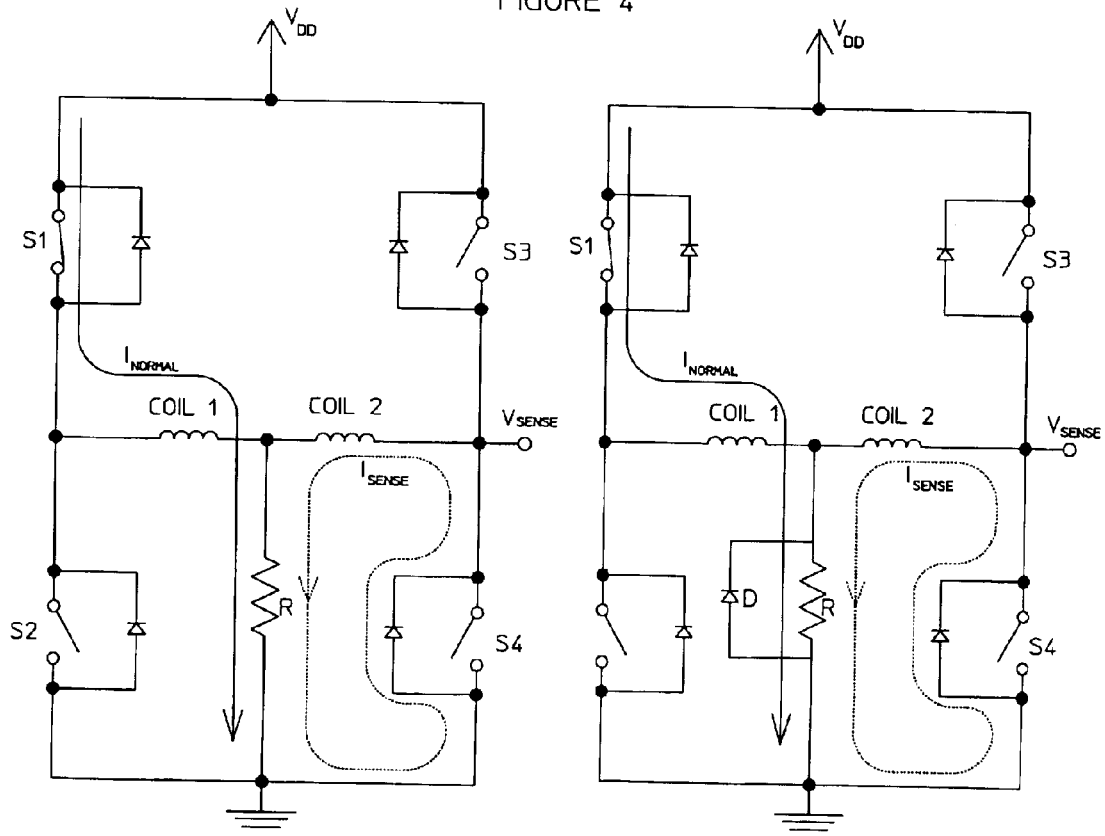
FIG. 5A illustrates a variation of the stall detection circuit for a stepper motor in accordance with the present invention.
FIG. 5B illustrates a further variation of the stall detection circuit for a stepper motor in accordance with the present invention.

More particularly, FIG. 4 depicts the voltage yield at the $V_{sense}$ pin from the three conditions of normal, stall and reverse. As used in FIG. 4, "normal" refers to the direction in which the rotor is moving when engaged in the intended step sequence. The intended step sequence may be forward mode or reverse mode. To illustrate, for the sake of simplicity each of FIGS. 3, 5A and 5B depict only one of the switching conditions of FIG. 2, namely the forward condition. Therefore, when in the forward condition, "normal" indicates that the rotor is moving in the forward mode as shown in FIG. 2A while "reverse" then indicates that the rotor has been stalled and is now moving in the direction opposite that which is intended. Were the intended condition to be the reverse mode, then "normal" would correspond with FIG. 2B, while reverse would occur when the rotor, having stalled, begins moving "forward".

Accordingly, the voltage level output in the stall condition is indicated by VDD/2 and the voltage level in the reverse condition, i.e., the direction opposite the intended step sequence, is indicated by VDD. Thus, the two voltage levels effectively differentiate reverse and stall conditions from the normal direction of rotor movement, with the greatest back EMF being generated in the "reverse" condition.

Further embodiments of the stall detection circuit according to the present invention are shown in FIGS. 5A and 5B. In FIG. 5A, the fifth switch S5 and resistor R are replaced with a resistor R1. The resistance value of R1 is preferably a few orders of magnitude larger than the resistance value of coil 2. In an HVAC system with approximately 100 Ohms winding resistance, for example, the resistor R1 would be sized at a few kOhms, preferably 3.3-5 kOhms. This ensures that steady state current diverting to the added resistor R1 when S4 is closed remains low, so that most of the power is delivered to both of the windings, thereby maximizing motor efficiency.

As shown in FIG. 5B, a diode D2 can be placed in parallel with the resistor R1.

According to a method of the present invention, the stall detection circuit having the additional current pathway in an H-bridge configuration is operated in a sequence of steps as follows. During a first step, current is driven from the first switch to the fourth switch through the first and second coils. Preparatory to the second step, the fourth switch is opened while the first switch remains closed so as to divert the current to the additional current pathway extending from between the two coils to ground. After residual current in the second coil is extinguished, back EMF generated by the motor is detected through the second coil as a sense voltage, from which the motor operating condition may be determined.

When the additional circuit pathway includes a fifth switch, as shown in FIG. 3, the method further includes the step of closing the fifth switch a few microseconds before the fourth switch is opened, as depicted in FIG. 4.

In summary, due to the distinctive differences in the motor back EMF profile generated by normal motor operation versus that produced in a stall or reverse condition, if the stepping sequence is modified such that a monitoring phase, in which the phase voltage is momentarily extinguished, is executed for a short time prior to stepping to the next sequence, a stall condition can be easily detected from the back EMF generated by the motor. For HVAC actuators, only a few milliseconds of sense time are typically needed. The overall output torque of the motor is therefore not compromised.

Figure 2C:
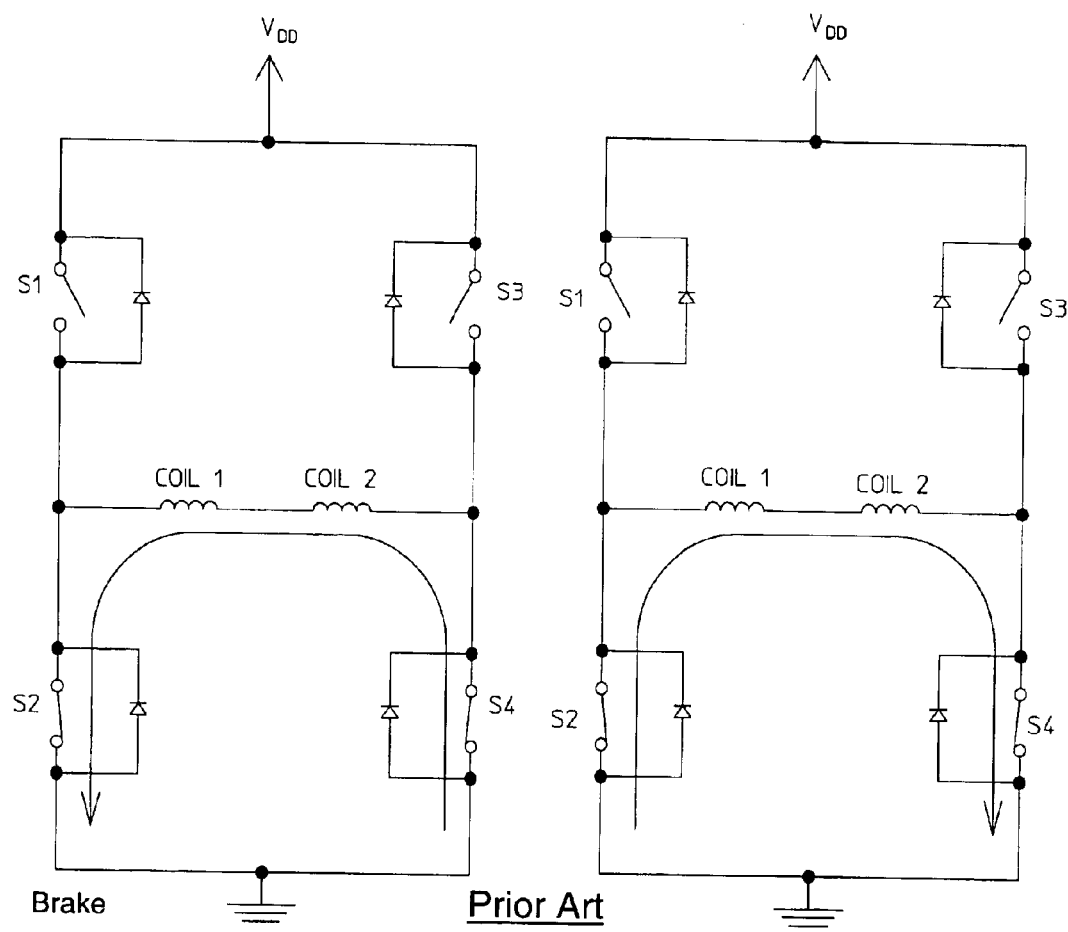
FIG. 2C is a circuit diagram of conventional H-bridge step sequences for a stepper motor under braking conditions.

Upon detection of a stall condition, the driver (not shown) or other control unit used in connection with an H-bridge configuration, as would be known by persons of ordinary skill in the art, can generate a warning signal and then, depending upon the particular system specification, either remove power from the motor or remain in the last sequence shown in FIG. 2C to brake the motor.

The foregoing descriptions and drawings should be considered as illustrative only of the principles of the invention. The invention may be configured with different combinations of electrical components and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A stall detection circuit for a stepper motor, said circuit having an H-bridge construction in which current alternatingly flows from a first switch through first and second coils to a fourth switch, and then from a second switch through the second and first coils to a third switch, said stall detection circuit comprising an additional circuit pathway from ground to a point between the first and second coils, said additional circuit pathway conveying current away from the second coil during a monitoring phase between step sequences when the first switch is closed and the fourth switch is open, said second coil during said monitoring phase detecting the back electromotive force generated by the motor in order to determine rotor condition.

2. The stall detection circuit as set forth in claim 1, wherein said additional circuit pathway includes a fifth switch and a resistor.

3. The stall detection circuit as set forth in claim 2, wherein a resistance level of said resistor is approximately equal to a resistance level of said second coil.

4. The stall detection circuit as set forth in claim 1, wherein said additional circuit pathway includes a resistor.

5. The stall detection circuit as set forth in claim 4, wherein a resistance level of said resistor is a few orders of magnitude larger than a resistance level of said second coil.

6. The stall detection circuit as set forth in claim 4, further comprising a diode in parallel with said resistor.

7. A stall detection circuit for a stepper motor, said circuit comprising an H-bridge construction in which current alternatingly flows from a first switch through first and second coils to a fourth switch, and then from a second switch through the second and first coils to a third switch, said circuit including an additional circuit pathway from ground to a point between the first and second coils, said additional circuit pathway including a resistor so that steady state current diverting to said pathway is low, said pathway, during a monitoring phase when the first switch is closed and the fourth switch is open, acting to convey current from the first coil to ground and thereby allow the second coil to detect back electromotive force generated by the motor in order to determine rotor condition.

8. The stall detection circuit as set forth in claim 7, wherein said additional circuit pathway includes a fifth switch between the resistor and ground, said fifth switch being closed a few microseconds before said fourth switch is opened during said monitoring phase.

9. The stall detection circuit as set forth in claim 8, wherein a resistance level of said resistor is approximately equal to a resistance level of said second coil.

10. The stall detection circuit as set forth in claim 7, wherein a resistance level of said resistor is a few orders of magnitude larger than a resistance level of said second coil.

11. The stall detection circuit as set forth in claim 10, further comprising a diode in parallel with said resistor.

12. The stall detection circuit as set forth in claim 7, further comprising a diode in parallel with said resistor.

13. A method of detecting a stepper motor operating condition using a stall detection circuit with a generally H-bridge construction in which current alternatingly flows from a first switch through first and second coils to a fourth switch, and then from a second switch through the second and first coils to a third switch, said circuit further including an additional circuit pathway to ground connected at a point between said first and second coils, the method comprising the steps of:

driving current from the first switch to the fourth switch through the first and second coils;

opening said fourth switch while said first switch remains closed so as to divert said current after said first coil to said additional circuit pathway;

extinguishing residual current in said second coil;

detecting with said second coil a back electromotive force generated by said motor as a sense voltage; and determining from said sense voltage the motor operating condition.

14. The method as set forth in claim 13, wherein said additional circuit pathway includes a fifth switch and the method includes the step of closing the fifth switch a few microseconds before the step of opening said fourth switch.

15. The method as set forth in claim 14, wherein said method includes the step of including a resistor on said additional circuit pathway prior to said fifth switch, said resistor having a resistance value approximately equal to a resistance value of said second coil.

\* \* \* \* \*